Dec. 17, 1968 J. REED 3,417,271
ELECTROMAGNETIC COUPLING DEVICES
Filed March 21, 1966 2 Sheets-Sheet 1

Inventor
J. REED
By
Holcombe, Wetherill & Brisebois
Attorneys

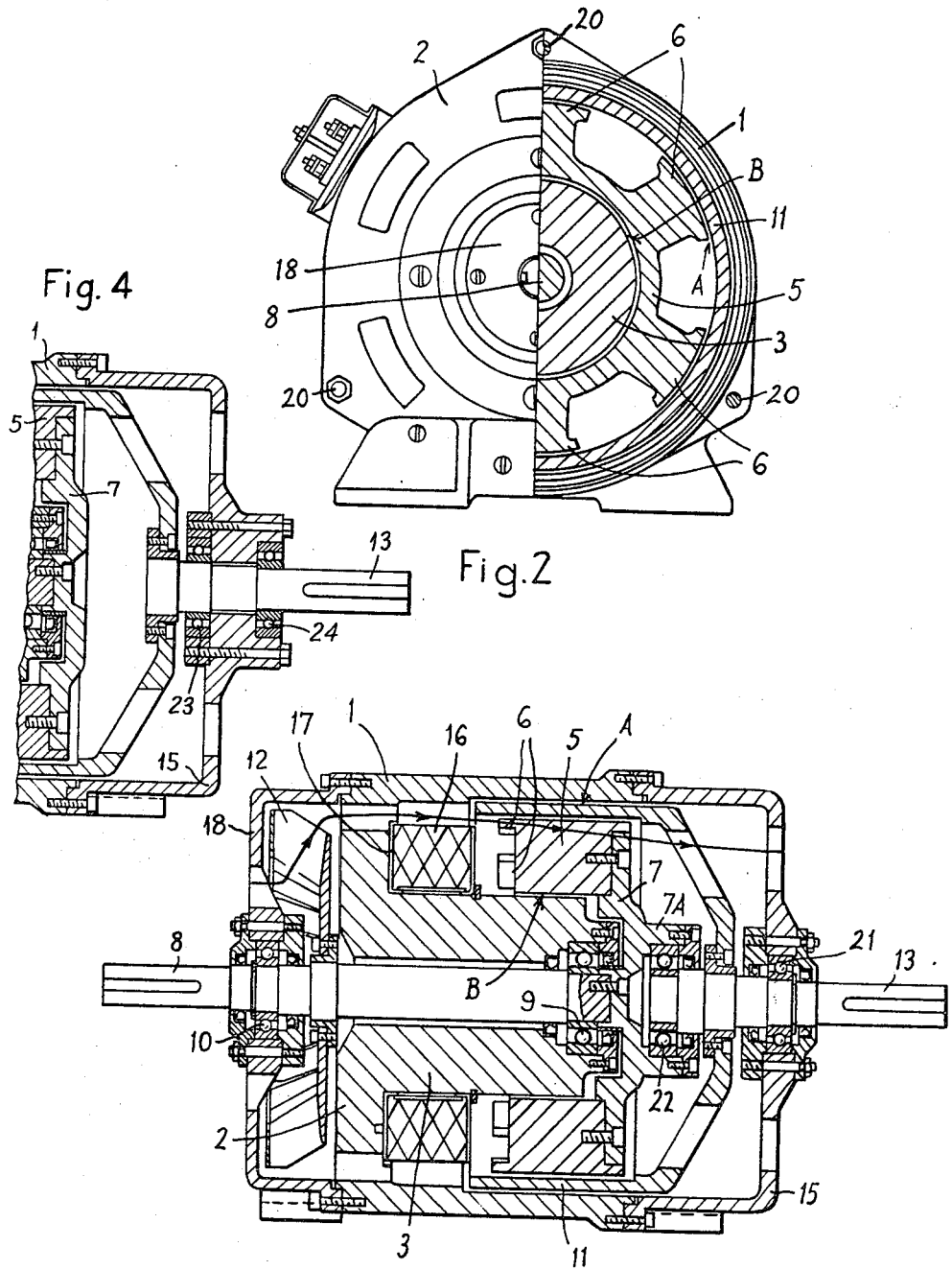

United States Patent Office 3,417,271
Patented Dec. 17, 1968

3,417,271
ELECTROMAGNETIC COUPLING DEVICES
Jonathan Reed, Cambridge, England, assignor to Pye Limited, Cambridge, England
Filed Mar. 21, 1966, Ser. No. 535,917
Claims priority, application Great Britain, Mar. 25, 1965, 12,781/65
2 Claims. (Cl. 310—103)

ABSTRACT OF THE DISCLOSURE

An electromagnetic coupling device for transmitting torque from a driving shaft to a driven shaft comprising a stator consisting of an inner and outer spaced concentric axially extending portions and a radial interconnecting portion, a first shaft carrying a rotor of magnetic material surrounding one end of said inner axial portion of the stator positioned to define a wider primary air gap between the rotor and the outer axial portion of the stator and a narrower secondary air gap between the rotor and the inner axial portion of the stator, a second shaft carrying a rotatable member which is coaxial with the rotor and the stator which has a cylindrical portion of electrically conductive non-magnetic material located in the primary air gap, means on said stator for producing a toroidal magnetic field which confers the same polarity on all of the rotor pole pieces on said rotor, and separate bearing assemblies for said first and second shafts.

---

Figure 1:
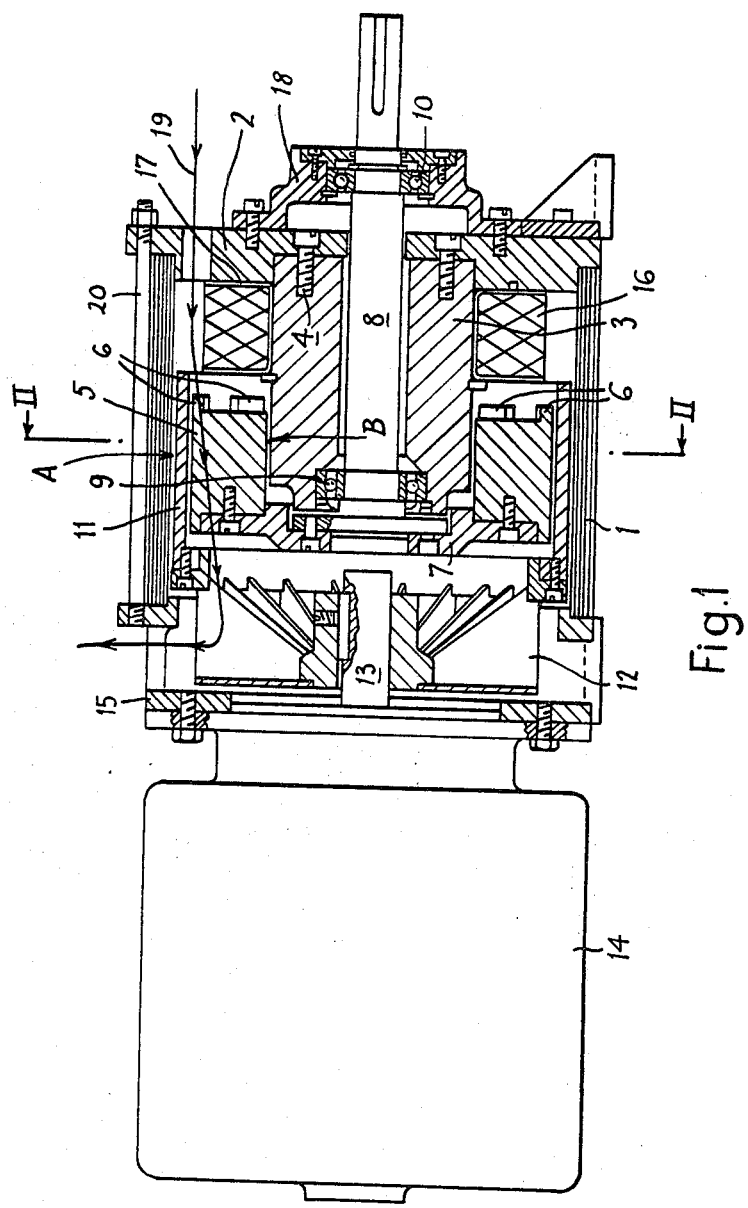

The present invention relates to electromagnetic coupling devices particularly for transmitting torque from a driving shaft to a driven shaft or for acting as an induction brake on a driven shaft. The coupling devices according to the present invention are improvements in or modifications of the coupling devices disclosed in our Patent No. 3,054,006.

The invention consists in a magnetic induction coupling device comprising a stator of magnetic material consisting of inner and outer spaced concentric axially extending portions and a generally radial portion interconnecting said two spaced axial portions, a rotor of magnetic material surrounding a part of the inner axial portion of the stator and spaced from both axial portions of the stator so as to define a wider primary air gap between the rotor and the outer axial portion of the stator and a narrower secondary air gap between the rotor and the inner axial portion of the stator, a plurality of pole pieces on said rotor projecting towards the outer axial portion of said stator, a rotatable member coaxial with the rotor and the stator and having a generally cylindrical portion of electrically conductive non-magnetic material located in the primary air gap and means for producing a toroidal magnetic field which confers the same polarity on all of the rotor pole pieces and whose axis lies along the axis of rotation of the rotor and which passes both through the rotor and the stator and once radially through the rotatable member.

The toroidal magnetic field may be produced electrically by means of one or more excitation coils which can be fed by either a direct or an alternating excitation current. Alternatively the toroidal magnetic field may be produced by means of one or more permanent magnet members. Where an electrical excitation current is employed, the magnetic field may be made variable, for example where it is desired to vary the speed or torque of the coupling. A variation of the strength of the magnetic field can also be achieved where one or more permanent magnet members are employed either by the adjustment of two or more magnets with respect for each other or by arranging an adjustable shunt or an adjustable air gap in association with the magnet or magnets.

The stator may be built up in three sections consisting of an outer axially extending portion forming the machine casing ring, which may comprise a plurality of axially extending concentric laminations, an inner axially extending cylindrical portion and a radially extending end member connected to the two axially extending portions. The inner portion and end member may also be of laminated construction. Moreover the various portions of the stator may be integral instead of being made separately, in which case the stator may be formed as a casting or as a laminated unit.

The rotor preferably consists of a generally cylindrical member of magnetic material arranged at one end of the stator between the inner and outer axial portions of the stator and having projecting pole pieces projecting towards the outer axial portion of the stator. The pole pieces preferably are extended in a circumferential direction towards their tips and may be integral with the rotor body or may be of laminated construction. The rotor may be carried by an end plate made of magnetic or non-magnetic material, which is mounted on a shaft which may extend through a bore in the inner axial stator portion.

The rotatable member, or torque tube, is made of an electrically conductive non-magnetic material for example copper, aluminium or a copper-aluminium alloy. It is located in the primary air gap between the tips of the rotor pole pieces and the outer axial stator portion. The rotatable member may be mounted on a shaft carried in bearings in a plate member which may form part of the casing of the machine. Either of the shafts may also carry a fan for drawing cooling air through the coupling during its operation.

In order that the invention may be more fully understood, reference will now be made to the accompanying drawings, in which:

FIGURE 1 is axial section through one embodiment of induction coupling according to this invention and also shows a driving motor for the coupling, FIGURE 2 is partly an end view and partly a section on the lines II—II in FIGURE 1, FIGURE 3 is axial section through a further embodiment of induction coupling, and FIGURE 4 is a partial view showing a modification to the embodiment of FIGURE 3.

Referring to FIGURES 1 and 2, the coupling comprises a stator which is built up in three sections, namely an outer axially extending portion or casing ring 1 consisting of a plurality of concentric laminations, an end plate 2, and an inner axially extending cylindrical portion 3. The portion 3 is supported from the end plate 2 by bolts 4. Between the casing ring 1 and cylindrical portion 3 is rotatably mounted a rotor 5 having circumferentially flared radially extending pole pieces 6, the rotor being connected to a plate 7, e.g. by bolts, which is itself directly connected to a shaft 8 mounted in bearings 9 and 10 and extending through a bore in the stator portion 3. A primary air gap A is provided between the tips of the pole pieces and casing ring 1 and within this gap lies a cylindrical rotatable member or torque tube 11 made from non-magnetic material, preferably a light alloy or copper or a copper aluminium alloy. The torque tube is itself supported by the periphery of a fan 12 which is mounted on a shaft 13. This shaft may constitute or be connected to the output shaft of a motor 14 for driving the coupling and which is attached to the end plate 15 of the casing of the coupling. Tie bolts 20 extend between the end plates 2 and 15 to hold the casing assembly together. A secondary air gap B, smaller than the primary air gap A, is provided between the rotor 5 and cylindrical inner stator portion 3. The field coil 16 for energising the coupling is mounted within a metal cup 17 which itself is directly mounted upon the cylindrical portion 3.

The casing ring 1, end plate 2, cylindrical portion 3 and rotor 5 are all made from magnetic material, and if the field coil 16 is to be energised from an A.C. supply it is preferable that the end plate 2 and rotor 5 are made up from laminations. The plate 7 may also be made of magnetic materials, in which case its shape would conform to that of the rotor. However, it is preferred that the plate 7 is made from a light alloy material which will lower the inertia of the rotor 5 and in which case it need not conform exactly in shape to that of the rotor, but provision must be made to allow cooling air to pass through it. The bearing 10 is preferably housed within a support 18 made from non-magnetic material as it has been found that if the support 18 is made from magnetic material it can act as a magnetic pole and cause leakage flux where the coupling is mounted on a support of magnetic material, such as steel. This leakage will tend to by-pass the primary (torque tube) air gap if the motor casing has a cast iron or ferrous flange by which it is bolted to the end plate 15. The magnetic circuit for the coupling is similar to that disclosed in our Patent No. 3,054,006 and is from the field coil 16 axially along the cylindrical portion 3, radially through the rotor pole pieces 6 and the torque tube 11, axially along the casing end 1, and radially through the end plate 2.

The cooling of the coupling is achieved by the fan 12 which draws air as indicated by the arrowed line 19 through apertures in the end plate 2, across the field coil 16, between the rotor poles 6 and out through the casing 15.

As shown in FIGURE 1, the drive from the motor 14 is to the torque tube 11 and the driven output member is the rotor 5 and shaft 8. The coupling, however, may quite conveniently have the drive applied to the rotor shaft 8 and the output taken from the torque tube shaft 13, in which case the fan would be mounted on the constant speed member, i.e. the rotor.

An alternative construction is shown in FIGURE 3. Corresponding reference numerals to FIGURE 1 have been used to indicate like parts. In this construction the input drive is to the rotor 5 through the shaft 8 and the output is from the torque tube 11 through the shaft 13, the cooling fan being mounted on the rotor shaft 8. The shaft 13 is mounted in bearings 21 and 22 respectively supported in the end plate 15 and a boss 7a on the rotor mounting plate 7. FIGURE 4 shows a modification to the embodiment of FIGURE 3, wherein the bearing 22 for the shaft 13 is dispensed with and the shaft is supported in the end plate 15 by means of bearings 23 and 24. Thus there is no mechanical connection through the bearings between the input and output shafts. The construction and operation of these alternative arrangements is similar to that for the embodiment shown in FIGURE 1, except that the casing ring 1 is non-laminated and is formed integrally with the end member 2 and cylindrical portion 3 as a casting, thus simplifying the construction.

The constructions according to the present invention give the advantage that they are more compact than those described in our Patent No. 3,054,006. Moreover in the constructions of FIGURES 1, 2 and 4 there is no connection between the torque tube 11 and rotor 5, and therefore no mechanical coupling between the input and the output shafts. Consequently the torque range can be increased above that for the constructions described in our aforementioned patent. Also in this construction heat generated in the torque tube due to eddy currents will not be transmitted to an internal bearing of the coupling.

I claim:

1. A magnetic induction coupling device comprising a stator of magnetic material consisting of inner and outer spaced concentric axially extending portions and a generally radial portion interconnecting said two spaced axial portions, a first shaft carrying a rotor of magnetic material surrounding one end of the inner axial portion of the stator and spaced from both axial portions of the stator so as to define a wider primary air gap between the rotor and the outer axial portion of the stator and a narrower secondary air gap between the rotor and the inner axial portion of the stator, a plurality of pole pieces on said rotor projecting towards said stator and having tips which are extended in a circumferential direction, a second shaft carrying a rotatable member which is coaxial with the rotor and the stator and which has a generally cylindrical portion of electrically conductive non-magnetic material located in the primary air gap, means carried by said stator for producing a toroidal magnetic field which confers the same polarity on all of the rotor pole pieces and whose axis lies along the axis of rotation of the rotor and which passes both through the rotor and the stator and once radially through the rotatable member, and separate bearing assemblies for said first and second shafts whereby there is no mechanical coupling between said shafts through said bearing assemblies.

2. An induction coupling as claimed in claim 1, wherein said first shaft carrying said rotor passes through a bore in the inner portion of said stator and a bearing for said shaft is disposed between said shaft and said stator and wherein said second shaft carrying said rotatable member is supported by a bearing axially spaced by an air gap from said bearing for said first shaft.

References Cited
UNITED STATES PATENTS

| | | | |
|---|---|---|---|
| 2,603,677 | 7/1952 | Winther | 310—105 |
| 3,020,427 | 2/1962 | Wheeler et al. | 310—105 |
| 3,054,006 | 9/1962 | Bancroft | 310—92 |
| 3,167,674 | 1/1965 | Woodward | 310—105 |
| 3,170,079 | 2/1965 | Jaeschke | 310—105 |

ROBERT K. SCHAEFER, *Primary Examiner.*

H. O. JONES, *Assistant Examiner.*